(12) United States Patent
Nasshan

(10) Patent No.: US 7,039,414 B1
(45) Date of Patent: May 2, 2006

(54) APPARATUS AND METHOD FOR ALLOWING COMMUNICATION SYSTEMS TO COEXIST

(75) Inventor: Markus Nasshan, Erding (DE)

(73) Assignee: Siemens Aktiengesellschaft, Munich (DE)

( * ) Notice: Subject to any disclaimer, the term of this patent is extended or adjusted under 35 U.S.C. 154(b) by 374 days.

(21) Appl. No.: 10/381,651

(22) PCT Filed: Sep. 26, 2000

(86) PCT No.: PCT/DE01/03354

§ 371 (c)(1),
(2), (4) Date: Mar. 26, 2003

(87) PCT Pub. No.: WO02/28135

PCT Pub. Date: Apr. 4, 2002

(51) Int. Cl.
*H04Q 7/00* (2006.01)

(52) U.S. Cl. .................. 455/448; 455/450; 455/512

(58) Field of Classification Search .............. 455/448, 455/447, 449, 450, 451, 452.1, 452.2, 454, 455/512, 513, 62, 66.1
See application file for complete search history.

(56) References Cited

U.S. PATENT DOCUMENTS

| 5,483,666 A | 1/1996 | Ohmori et al. |
| 5,884,145 A | 3/1999 | Haartsen |
| 5,903,848 A * | 5/1999 | Takahashi .................. 455/512 |
| 6,892,068 B1 * | 5/2005 | Karabinis et al. ........... 455/429 |

FOREIGN PATENT DOCUMENTS

| EP | 0 629 097 | 12/1994 |
| EP | 0 687 117 | 12/1995 |

* cited by examiner

*Primary Examiner*—William J. Deane, Jr.
(74) *Attorney, Agent, or Firm*—Bell, Boyd & Lloyd LLC

(57) ABSTRACT

An apparatus and associated method are provided, wherein, using an external-signal detection apparatus for detecting external signals of the available channels of a jointly used transmission-medium and a priority-apparatus for detecting at least one separate transmission-medium use priority, and with a data communication interface controlling data transmission on the basis of the detected external signals in the at least one detected transmission-medium use priority, both identical and different independent communication systems are allowed to coexist in a simple and inexpensive manner.

18 Claims, 2 Drawing Sheets

APPARATUS AND METHOD FOR ALLOWING COMMUNICATION SYSTEMS TO COEXIST

BACKGROUND OF THE INVENTION

The present invention relates, generally, to an apparatus and a method for allowing communication systems to coexist and, more particularly, to an apparatus and a method for allowing multicarrier systems to coexist when there is a jointly used transmission medium.

As a result of a significant escalation in radio communication systems, in particular, the case will frequently arise in the future that two or more independent communication systems use the same transmission medium, such as frequency bands. This can result in interference until one or more of these communication systems fails.

When using, by way of example, two communication systems which operate on the basis of the same transmission method or transmission format (e.g., DECT), the standards stipulate methods for avoiding such interference. These conventional methods are known, by way of example, by the term dynamic channel allocation. A drawback of such conventional methods, however, is the fact that independent communication systems operating on the basis of the same transmission method or on the basis of different transmission methods do not communicate about the use of the jointly used transmission media.

Particularly when using independent communication systems operating on the basis of different transmission methods, such as DECT and PHS systems, interference which is sometimes considerable arises which can even result in one type of communication system failing. A field trial testing DECT systems against PHS systems, where more and more DECT and PHS systems were turned on in succession, saw, by way of example, the PHS systems fail after the DECT systems interfered with the PHS systems' control channels, firmly allocated on particular frequencies, due to a lack of free carrier frequencies or time slots.

The present invention is, therefore, directed toward an apparatus and a method for allowing communication systems to coexist which is simple and inexpensive to implement.

SUMMARY OF THE INVENTION

Particularly using an external-signal detection apparatus for detecting external signals on the available channels of the jointly used transmission medium and a priority-detection apparatus for detecting at least one separate transmission-medium use priority, with a data communication interface controlling data transmission on the basis of the detected external signals and the at least one detected transmission-medium use priority, both identical and different independent communication systems are allowed to coexist in a simple and inexpensive manner.

Alternatively, it is also possible to allow both identical and different independent communication systems to coexist using a priority-communication interface for implementing priority transmission of at least one external transmission-medium use priority for the further communication systems associated with the jointly used transmission medium and the priority-detection apparatus.

Preferably, this involves a transmission level for the data communication interface being controlled on the basis of the detected external signal and the transmission-medium use priority, with a transmission level being taken back completely in the extreme case; i.e., when priority is very low.

In addition, the data communication interface can have a channel allocation apparatus for allocating communication-system user channels used for transmission, the allocation of the user channels being controlled statically or dynamically on the basis of the detected external signals and/or the detected transmission-medium use priority. As such, depending on channel allocation apparatuses which are often already provided, alternate channels can be effected on the basis of a predetermined priority allocation in the independent communication systems, as a result of which an optimum yield is obtained for the transmission medium's available bandwidth.

The detected external signal can be, by way of example, a reception level for at least one further communication system. In this way, an extremely simple implementation is obtained. Alternatively, however, it is also possible to use an interference signal on a respective channel as the detected external signal, which, particularly in connection with a channel allocation apparatus, makes it possible to achieve optimized utilization of the available bandwidth of the jointly used medium.

Preferably, the external signal and/or the priority transmission is detected and/or is carried out at repeated intervals and, in particular, cyclically, which ensures priority-distributed coexistence of independent communication systems at any time.

Preferably, the apparatus also has a priority-communication interface for implementing direct or indirect priority transmission between the independent communication systems associated with the jointly used transmission medium. Such direct or indirect exchange of the allocated transmission-medium use priorities can be used to fit the independent communication systems optimally into an overall configuration in line with their respective use priority. In this context, the transmission-medium use priorities also can be distributed by a superordinate independent communication system or by a central control station decoupled therefrom, whereby independent communication systems quickly and easily can be allowed to coexist as desired. Such allocation of priorities can be effected, by way of example, on the basis of charges for use which have been paid for.

Additional features and advantages of the present invention are described in, and will be apparent from, the following Detailed Description of the Invention and the Figures.

DETAILED DESCRIPTION OF THE INVENTION

Figure 1:
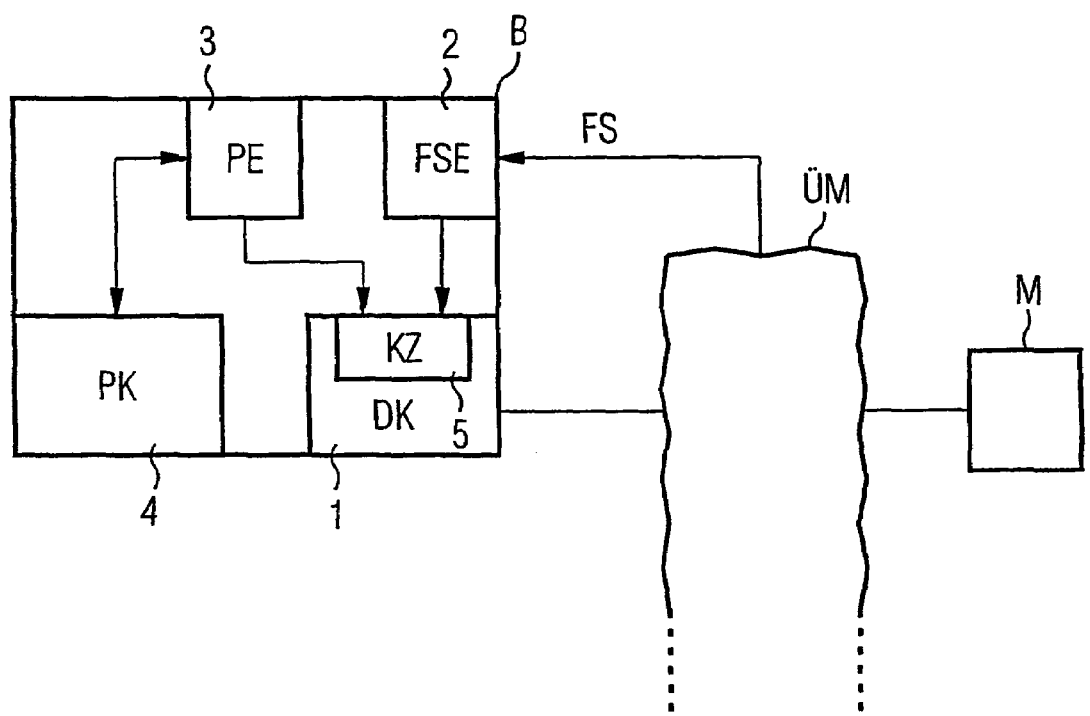
FIG. 1 shows a simplified block diagram of a communication system with the inventive apparatus.

FIG. 1 shows a simplified block diagram of an independent communication system with an inventive apparatus for allowing communication systems to coexist when there is a jointly used transmission medium ÜM.

The communication system shown in FIG. 1 basically includes a base station B, the transmission medium ÜM for transmitting data and at least one subscriber terminal M. Preferably, the communication system shown in FIG. 1 includes a radio communication system with a large number of mobile subscriber terminals M. Examples of such radio communication systems are, by way of example, GSM, UMTS, PHS, DECT, etc. However, the present invention is not limited to such radio communication systems, but instead similarly includes wired communication systems, such as line-connected multicarrier systems known as xDSL, Powerline, etc.

In all these systems, the transmission medium ÜM can be used by a large number of independent communication systems. To simplify matters, only radio communication systems are described below, although line-connected communication systems are not expressly precluded.

In line with FIG. 1, the base station B has a data communication interface 1 for implementing data transmission via the transmission medium ÜM to an associated subscriber terminal or mobile part M. Accordingly, the data communication interface 1 provides, by way of example, a DECT, PHS, UMTS, GSM, etc., interface, with the transmission medium in this case being a particular frequency band, for example. To allow independent communication systems to coexist, the base station B also can have an external-signal detection apparatus 2 for detecting external signals FS on available channels of the transmission-medium ÜM. To be more precise, the external-signal detection apparatus 2 can detect signals from further communication systems (not shown) which likewise use the jointly used transmission medium ÜM for transmission. In addition, the base station B has a priority-detection apparatus 3 for detecting at least one separate transmission-medium use priority. This transmission-medium use priority allows organization within a large number of independent communication systems when there is a jointly used transmission medium ÜM.

In the simplest case, FIG. 1 involves taking the detected transmission-medium use priority and a detected external signal FS as a basis for actuating the data communication interface 1 such that, when a lowest transmission-medium use priority is detected (i.e., the system always needs to make space in the event of collisions), it reduces a transmission level far enough for a further communication system transmitting on the same transmission medium ÜM not to be affected by interference any longer. Preferably, in this case, the external signal FS used is a received signal from the further independent communication system.

In principle, however, in line with FIG. 1, it is also possible to use another signal as external signal FS, with, by way of example, an interference signal being evaluated on a respective channel or carrier on the jointly used transmission medium ÜM. In this case, a channel allocation apparatus 5, which is normally already provided in the communication system, now can be used to control allocation of communication-system user channels used for transmission on the basis of the detected external signal FS and the at least one detected separate transmission-medium use priority. In this context, the external-signal detection apparatus 2 preferably detects the external signal FS at recurring time intervals or cyclically, whereby independent communication systems can be allowed to coexist dynamically.

Optionally, in line with FIG. 1, the apparatus for allowing communication systems to coexist can have, as an alternative to the external-signal detection apparatus 2 or in addition, a priority-communication interface 4 for implementing priority transmission of the at least one separate transmission-medium use priority between the independent communication systems associated with the jointly used transmission medium ÜM. This priority-communication interface 4 is used to provide more extensive options for dynamic allocation of priorities upon allowing communication systems to coexist when there is a jointly used transmission medium ÜM, as are described in more detail later with reference to FIG. 3.

In line with FIG. 1, the apparatus for allowing communication systems to coexist is situated in a base station in an independent communication system. It also could be situated in a subscriber terminal or mobile part M or at another location in the communication system, however.

Figure 2:
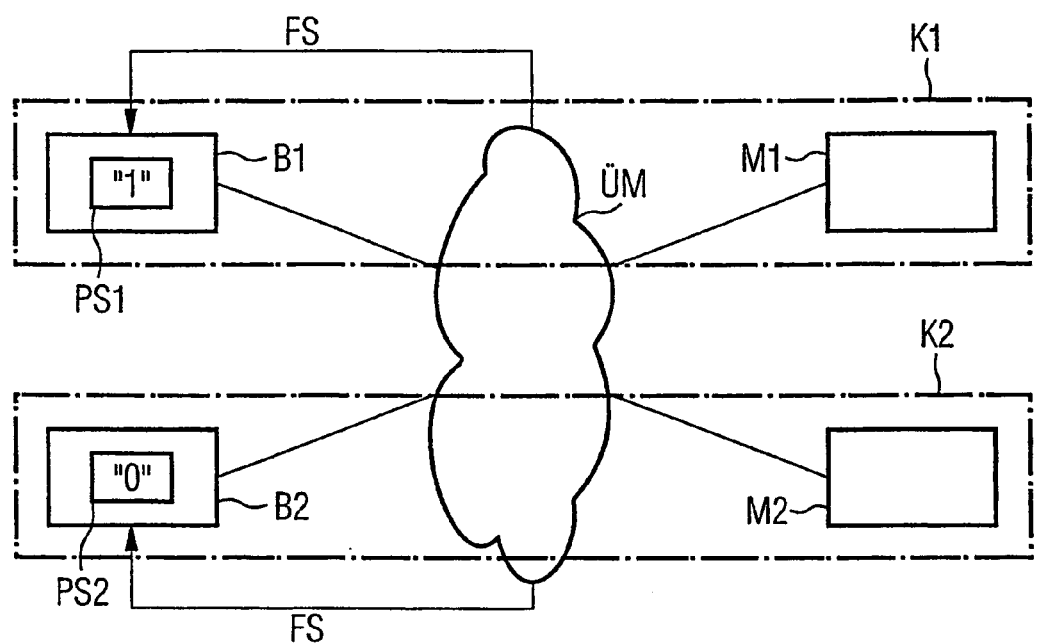
FIG. 2 shows a simplified block diagram of coexistence of two independent communication systems in line with a first and a second exemplary embodiment.

FIG. 2 shows a simplified block diagram to illustrate coexistence of two communication systems K1 and K2, with a fixed priority allocation having been made.

Exemplary Embodiment 1

In line with FIG. 2, a communication system K1 includes, by way of example, a DECT (digital enhanced cordless telephone) system, and a communication system K2 includes a PHS (personal handy system). The two communication systems, independent and operating using different transmission methods or formats, respectively include a base station B1, B2 and at least one mobile subscriber terminal M1, M2.

In this context, the jointly used transmission medium ÜM is a common or overlapping frequency band.

In line with this first exemplary embodiment, the PHS communication system K2 is intended to be given higher priority ("0") than the DECT communication system K1. This transmission-medium use priority is stored permanently, by way of example, in the base stations B1 and B2. So that the DECT communication system K1 can now start operating, the frequencies on which, by way of example, control channels for the PHS system K2 exist need to be monitored first, for example. If, by way of example, interference signals at these frequencies are measured as external signals FS and if these external signals exceed a particular threshold value, for example, the DECT communication system K1 cannot start operating. In this context, the DECT communication system K1 cyclically checks, by monitoring the interference on the control channels for the PHS communication system K2, for example, whether it has to continue to remain inactive. If the detected external signal value or the interference signal falls below a particular threshold value, the DECT communication system K1 can start operating. This provides a simple and inexpensive way of using the external-signal detection apparatus 2 to allow different communication systems to coexist.

Exemplary Embodiment 2

In the same way, in line with FIG. 2, an unlicensed (local or "residential") UMTS communication system and a cell-based UMTS communication system can operate in the same frequency band or in a jointly used transmission medium. Since, by way of example, the operator of the cellular UMTS communication system had to pay for his/her frequency band, his/her cellular system is given a higher transmission-medium use priority than the unlicensed UMTS communication system (residential UMTS system). The un-licensed UMTS communication system can, therefore, only start operating if it is a certainty that the cellular UMTS communication system is not subject to interference.

In line with this present second exemplary embodiment, such coexistence of independent communication systems using identical transmission methods can be regulated, by way of example, such that the unlicensed UMTS communication system, in turn, uses its external-signal detection apparatus to receive a reception level for the cellular UMTS communication system and, depending on this reception level for the cellular UMTS system's control channels and its lowest transmission-medium use priority, for example, ascertains a maximum transmission power for the local UMTS communication system. The higher the cellular UMTS communication system's reception level received as an external signal FS, for example, the lower the permitted maximum transmission power or the transmission level of the local UMTS communication system as a result. In this case, by way of example, it is possible to use a linear or nonlinear relationship between the local UMTS communication system's permitted maximum transmission power and the cellular UMTS communication system's reception level. In this way, it is always certain that the unlicensed UMTS communication system is not interfering with the cellular UMTS communication system. In addition, allowing communication systems to coexist in this way is particularly simple and inexpensive.

Exemplary Embodiment 3

Figure 3:
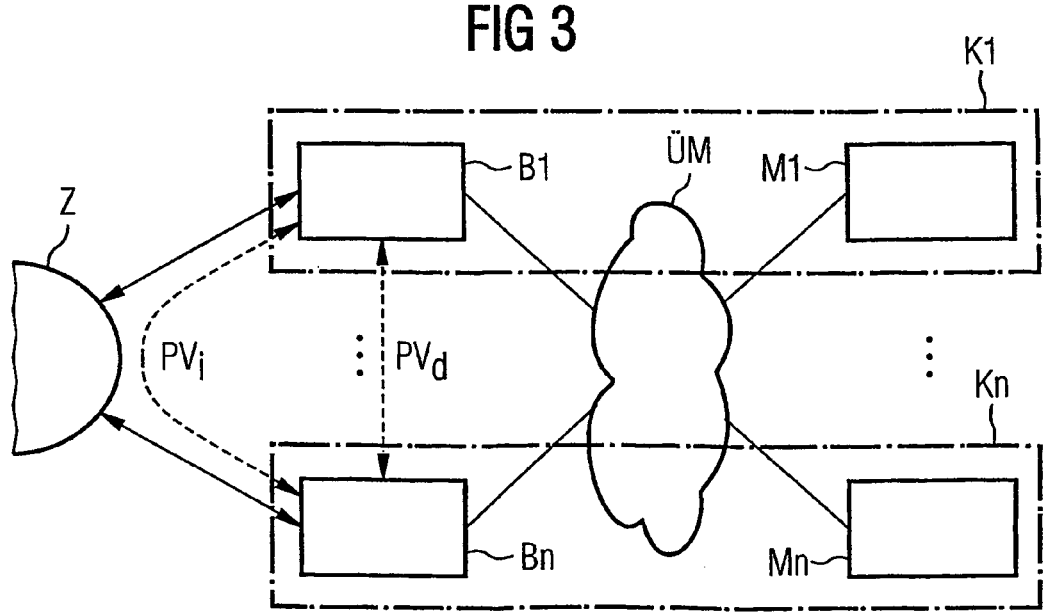
FIG. 3 shows a simplified block diagram of coexistence of two independent communication systems in line with a third exemplary embodiment.

FIG. 3 shows a simplified block diagram for allowing independent communication systems to coexist in line with a third exemplary embodiment, where the same references denote the same elements as in FIGS. 1 and 2 and a detailed description is dispensed with below.

In line with FIG. 3, a large number of independent communication systems K1 to Kn operate on the basis of the same or different transmission methods, for example, but they are able to communicate with one another as a result of the priority-communication interface 4 as shown in FIG. 1. Such a priority-communication interface 4 can be, by way of example, a radio interface with the system-specific transport channels. In line with FIG. 3, the option now exists of direct communication or priority allocation $PV_d$ between the independent communication systems K1 to Kn. In the same way, however, indirect priority allocation $PV_i$ also can be carried out via a central control station Z, for example, with the transmission-medium use priorities detected or ascertained in the respective communication systems K1 to Kn being able to be communicated or exchanged.

In this context, the coexistence of the independent communication systems K1 to Kn is regulated by priority allocation or priority exchange via the priority communication interface 4. Each communication system K1 to Kn can be allocated a predetermined transmission-medium use priority, for example. In this case, the communication systems K1 to Kn and the communication systems present in the jointly used transmission medium exchange their respective priorities, and the communication systems K1 to Kn access the transmission medium ÜM on the basis of their allocated or separate transmission-medium use priority and the rest of the transmission-medium use priorities provided in the system. In the simplest case, access is effected only when no higher-priority system is active. The bandwidth available in the transmission medium ÜM also can be quantitatively or qualitatively split on the basis of the transmission-medium use priorities.

In addition, besides the fixed priority allocation described above, which can be made both directly and indirectly, it is also possible for dynamic priority allocation to take place; for example, via the central control station Z. In the case of such dynamic priority allocation, the independent communication systems K1 to Kn are not only able to communicate with one another using the priority-communication interface 4 but also able to update their respective transmission-medium use priorities. Preferably, such updating or modification is performed by the superordinate central control station Z. It is also conceivable, however, for such dynamic priority allocation to be made by an independent communication system with high priority (master communication system). In this way, the access rights to a jointly used transmission medium ÜM can be altered dynamically on the basis of complex access authorizations, which provides an extremely high level of flexibility at the same time as optimum utilization of an available transmission medium.

The present invention has been described with particular reference to radio communication systems. It is not limited thereto, however, and similarly includes line-connected communication systems and, in particular, line-connected multicarrier systems.

Indeed, although the present invention has been described with reference to specific embodiments, those of skill in the art will recognize that changes may be made thereto without departing from the spirit and scope of the present invention as set forth in the hereafter appended claims.

The invention claimed is:

1. An apparatus for allowing communication systems to coexist when there is a jointly used transmission medium, comprising:
   a base station operable in one of said communications systems;
   a data communication interface for implementing proprietary data transmission within a communication system using available channels of the jointly used transmission system;
   a priority communication interface, wherein said priority communication interface obtains a priority transmission of at least one separate transmission medium service priority for a further communication system of the jointly used transmission medium and
   a priority-detection apparatus for detecting at least one proprietary and the separate transmission-medium use priority, with the data communication interface controlling the data transmission based on the detected proprietary and the separate transmission-medium use priority.

2. An apparatus for allowing communication systems to coexist when there is a jointly used transmission medium as claimed in claim 1, wherein the data communication interface controls a transmission level for the data transmission.

3. An apparatus for allowing communication systems to coexist when there is a jointly used transmission medium as claimed in claim 1, wherein the data communication interface includes a channel-allocation apparatus for allocating user channels in the communication system which are used for the data transmission, and controls the allocation of the user channels.

4. An apparatus for allowing communication systems to coexist when there is a jointly used transmission medium as claimed in claim 1, wherein the detected priority transmission of at least one separate transmission medium service priority for a further communication system includes a reception level for at least one further communication system.

5. An apparatus for allowing communication systems to coexist when there is a jointly used transmission medium as claimed in claim 1, wherein the detected priority transmission of at least one separate transmission medium service priority for a further communication system includes an interface signal from at least one further communication system.

6. An apparatus for allowing communication systems to coexist when there is a jointly used transmission medium as claimed in claim 1, wherein the priority detection apparatus detects external signals cyclically.

7. An apparatus for allowing communication systems to coexist when there is a jointly used transmission medium as claimed in claim 1, wherein the communication systems have transmission formats which are one of identical and different.

8. An apparatus for allowing communication systems to coexist when there is a jointly used transmission medium, comprising:
- a base station operable in one of said communications systems;
- a data communication interface for implementing proprietary data transmission within a communication system using available channels of the jointly used transmission medium;
- a priority-communication interface for implementing priority transmission of at least one external transmission-medium service priority for the further communication systems associated with the jointly used transmission medium; and
- a priority-detection apparatus for detecting at least one separate transmission-medium use priority and the at least one external transmission-medium use priority, with the data-communication interface controlling the data transmission based on the separate transmission-medium use priority and the at least one external transmission-medium use priority.

9. An apparatus for allowing communication systems to coexist when there is a jointly used transmission medium as claimed in claim 8, wherein the data communication interface controls a transmission level for the data transmission.

10. An apparatus for allowing communication systems to coexist when there is a jointly used transmission medium as claimed in claim 8, wherein the data communication interface includes a channel-allocation apparatus for allocating user channels in the communication system which are used for the data transmission, and controls the allocation of the user channels.

11. An apparatus for allowing communication systems to coexist when there is a jointly used transmission medium as claimed in claim 8, wherein the priority-communication interface carries out priority transmission of the transmission-medium use priorities, the priority transmission being one of direct and indirect.

12. An apparatus for allowing communication systems to coexist when there is a jointly used transmission medium as claimed in claim 8, wherein the communication systems have transmission formats which are one of identical and different.

13. A method for allowing communication systems to coexist when there is a jointly used transmission medium, the method comprising the steps of:
- transmitting or receiving at least one separate transmission medium service priority between communication systems of the jointly used transmission medium via a base station of one of the communication systems;
- detecting at least one proprietary and the separate transmission medium service priority; and
- controlling data transmission on the jointly used transmission medium based on the at least one proprietary and the separate transmission-medium use priority.

14. A method for allowing communication systems to coexist when there is a jointly used transmission medium as claimed in claim 13, wherein the step of controlling data transmission includes controlling a transmission level for the data transmission.

15. A method for allowing communication systems to coexist when there is a jointly used transmission medium as claimed in claim 13, wherein the step of controlling data transmission includes carrying out channel allocation for allocating communication-system user channels used for transmission, with the channel allocation being controlled.

16. A method for allowing communication systems to coexist when there is a jointly used transmission medium as claimed in claim 13, wherein, in the step of detecting at least one proprietary and the separate transmission medium service priority includes one of a reception level for and an interference signal from the at least one further communication system.

17. A method for allowing communication systems to coexist when there is a jointly used transmission medium as claimed in claim 13, wherein detection is effected cyclically in the step of detecting at least one proprietary and the separate transmission medium service priority.

18. A method for allowing communication systems to coexist when there is a jointly used transmission medium as claimed in claim 13, wherein the communication systems use transmission formats for data transmission which are one of identical and different.

\* \* \* \* \*